United States Patent
Tune et al.

(10) Patent No.: US 9,294,301 B2
(45) Date of Patent: Mar. 22, 2016

(54) SELECTING BETWEEN CONTENDING DATA PACKETS TO LIMIT LATENCY DIFFERENCES BETWEEN SOURCES

(71) Applicants: Andrew David Tune, Dronfield (GB); Sean James Salisbury, Appley Bridge (GB); Alistair Crone Bruce, Farnham (GB)

(72) Inventors: Andrew David Tune, Dronfield (GB); Sean James Salisbury, Appley Bridge (GB); Alistair Crone Bruce, Farnham (GB)

(73) Assignee: ARM Limited, Cambridge (GB)

(*) Notice: Subject to any disclaimer, the term of this patent is extended or adjusted under 35 U.S.C. 154(b) by 585 days.

(21) Appl. No.: 13/623,171

(22) Filed: Sep. 20, 2012

(65) Prior Publication Data

US 2014/0079074 A1    Mar. 20, 2014

(51) Int. Cl.
  *H04L 12/46*   (2006.01)
  *H04L 12/701*  (2013.01)

(52) U.S. Cl.
  CPC .............. *H04L 12/46* (2013.01); *H04L 45/00* (2013.01)

(58) Field of Classification Search
  CPC .................................................. H04L 47/623
  See application file for complete search history.

(56) References Cited

U.S. PATENT DOCUMENTS

| | | | |
|---|---|---|---|
| 5,845,096 A * | 12/1998 | Munguia et al. | 710/113 |
| 2002/0161884 A1 * | 10/2002 | Munger et al. | 709/224 |
| 2003/0043813 A1 * | 3/2003 | Van Wageningen et al. | 370/395.4 |
| 2003/0103450 A1 * | 6/2003 | Chapman et al. | 370/229 |
| 2008/0086572 A1 * | 4/2008 | Tune et al. | 709/238 |
| 2008/0288731 A1 * | 11/2008 | Izumi | 711/160 |
| 2009/0274049 A1 * | 11/2009 | Lai | 370/236 |

OTHER PUBLICATIONS

W. Weber et al, "A quality-of-service mechanism for interconnection networks in system-on-chips" Proceedings of the Design, Automation and Test in Europe Conference and Exhibition (DATE'05), 2005, pp. 1-6.

W.J. Daily, "Virtual-Channel Flow Control" IEEE Transactions on Parallel and Distributed Systems vol. 3, No. 2, Mar. 1992, pp. 194-205.

Daily Principles and Practices, Chapter 18 "Arbitration" pp. 360, 362.

* cited by examiner

*Primary Examiner* — Khaled Kassim
*Assistant Examiner* — Zhaohui Yang
(74) *Attorney, Agent, or Firm* — Nixon & Vanderhye P.C.

(57) ABSTRACT

An arbiter is configured to select one of several contending data packets transmitted from an initiator, the data packets comprising an identifier identifying the initiator and data. The arbiter comprises: a history buffer for storing the identifiers identifying the initiators of a plurality of recently selected data packets; and selection circuitry configured to select one of the contending data packets in dependence upon the initiators of the contending data packets and the initiators identified in the history buffer, such that a probability of a data packet being selected increases with the number of data packets selected since a data packet from the same initiator was selected.

17 Claims, 7 Drawing Sheets

SELECTING BETWEEN CONTENDING DATA PACKETS TO LIMIT LATENCY DIFFERENCES BETWEEN SOURCES

TECHNICAL FIELD

The technical field relates to interconnects and in particular to arbitrating between data packets received from different sources.

BACKGROUND

In a network where data streams may merge at a router the allocation of the network resources to the different streams in a fair way such that each stream receives an approximately equal share of the resources is a problem that has been addressed in a number of ways in the prior art.

Where a router receives say two streams then it can simply provide a fair arbitration scheme by selecting data streams alternately assuming the bandwidth of each data stream is the same. Where however, the router is downstream of a previous router, then one of the streams will contain data packets from two previous streams and thus, if the router is again allocated evenly between the input streams, the stream that has data packets from a single source will get the resource for half the time, while the stream with data packets from two sources will also get the resource for half the time meaning that the two streams from the earlier router will get the resource for a quarter of the time each, which would give the stream that comes directly to the router twice as much resource as the other streams.

An example of the above problem is shown in FIG. 1 where there are four sources of traffic A, B, C and D all requesting bandwidth at the same rate and being routed through routers 2, 4 and 6 that each have two inputs and one outputs. At the first router 2, C and D receive equal bandwidth. At the second router 4, B receives twice as much bandwidth as C or D and at the final router 6, A receives half of the available band width, B receives a quarter of the available bandwidth and C and D receive one eighth of the available bandwidth.

This problem has been addressed in the prior art in several different ways. In one solution a global timestamp is added to a data packet and when selecting a data packet for a resource the data packet with the oldest time stamp is selected. A problem with this solution is that the time stamp is relatively wide which adds to the bandwidth of the data stream. Furthermore, it is difficult to generate a global timestamp that provides a consistent view of time at different points in a network.

An alternative solution is one where the number of hops that a data packet makes is counted. The number of hops may be counted by incrementing a count value every time the data packet passes through a router. Where there is contention a data packet with the most hops can be preferentially selected. A problem with this is again that it adds information to the data packet increasing bandwidth requirements.

A still further solution is one where a master sends a marker with a data packet after it has sent a certain number of data packets and when allocating resources data packets from masters where a marker has not yet been received are prioritised. A disadvantage of this is that a record of whether or not markers have been received from each stream need to be kept and it is hard to deal with traffic from low latency sources or those that send little data.

It would be desirable to be able to provide an arbiter that can allocate resources in a fair manner to contending data packets without unduly increasing the bandwidth of the data traffic or the power and area requirements of the circuit

SUMMARY

A first aspect provides an interconnect configured to route data packets between a plurality of initiators and at least one recipient along a plurality of paths, said data packets comprising an identifier identifying said initiator and data, said interconnect comprising:

a plurality of routers, said routers comprising at least two inputs for receiving said data packets from at least two different paths and an output for outputting said received data packets;

at least one of said routers comprising an arbiter configured to select between contending data packets input to said router from said different paths to be output at said output;

said arbiter comprising a history buffer for storing said identifiers identifying said initiators of a plurality of recently output data packets;

said arbiter comprising selection circuitry configured to select one of said contending data packets to be output in dependence upon said initiators of said contending data packets and said initiators identified in said history buffer, such that a probability of a data packet being selected increases with the number of data packets selected since a data packet from the same initiator was selected.

The technology described herein recognises that data packets will generally carry an identifier identifying the initiator that sent them. It also recognises that when determining a fair allocation of resources knowing what initiator a data packet comes from can be used to distribute the resources between initiators provided that a record of which initiators recently had resources allocated to them is kept. Thus, providing an arbiter with a history buffer that stores identifiers identifying initiators of recently output data packets allows the arbiter to determine whether a contending data packet competing to be output comes from an initiator that has recently been selected or not. Thus, by using information already present in the data stream and by storing a history of the initiators of recently output data packets a selection can be made that allocates the resource between initiators.

In some embodiments, said selection circuitry is configured to select said contending data packet sent from said initiator that is determined from said history buffer to have been least recently selected for output.

Perhaps, the simplest implementation and one which provides a fair allocation of resources is where one simply selects the data packet from the least recently selected initiator. In this way the resources are allocated to initiators in a non-preferential manner, which in many cases may be desirable.

In some embodiments, following selection of said data packet said arbiter is configured to update said history buffer with said identifier identifying said initiator of said output data packet and to delete an oldest entry in said history buffer, said history buffer storing a list of said most recently output data packets.

The history buffer may store a list of the most recently output data packets, which allows for fair allocation or it may store a subset of these.

In some embodiments, said history buffer comprises fewer entries than a number of said plurality of initiators.

The size of the history buffer can be selected according to requirements. The larger it is the greater the area overhead but the more information regarding recent selections is stored and thus, the fairer the selection can be. A history buffer that is smaller than the number of the plurality of the initiators is found to provide an effective selection of data packets without increasing area unduly. Where there are fewer entries in the history buffer than there are initiators then there may be times when there are two contending data packets from initiators, neither of which are present in the history buffer, in such a case a random selection can be used. In any case the selection is being made between two initiators that have both not been selected recently and the one selected will be added to the history buffer, so that the other one may well be selected the next time. In this regard depending on the implementation of the interconnect and perhaps the traffic class of the data packet, non-selected data packets may simply be stalled at the input to the router, or they may be deflected such that they are routed further on and will return later to the router, or they may be stored in a pending buffer, or in some cases they may simply be dropped, the initiator generating the data packet again if no response is received.

In some embodiments, said arbiter is configured to access weighting indicators to indicative of a weighting of at least some of said plurality of initiators;

said selection circuitry being configured to select data packets from initiators with a higher weighting disproportionately more frequently than said selection circuitry selects data packets from initiators with a lower weighting.

Although the arbiter may treat initiators in an equal manner, in some embodiments the arbiter is configured to take account of weighting indicators that provide an indication of the importance of the initiator and how much resource should be allocated to it. In such a case the selection circuitry will select data packets from initiators with a higher weighting disproportionately more frequently than it selects data packets from initiators with a lower weighting. In this way, the arbiter prioritises traffic from certain initiators over traffic from other initiators but in such a way that the traffic from the lower priority initiators will still be selected albeit less frequently. The way this disproportionate selection is performed depends on embodiment and examples will be provided later.

Although the indicator indicating the weighting of the initiator can be provided to the arbiter in a number of different ways, for example it may be stored within a data store that is accessible by the arbiter, in some embodiments the weighting indicator is sent with the data packet.

In some embodiments, said weighting indicator indicates a requested bandwidth requirement of said initiator, a higher bandwidth requirement indicating a higher weighting.

The weighting indicator may comprise or be dependent on the requested bandwidth requirement of the initiator, a higher bandwidth requirement indicating a higher weighting. Initiators may have a bandwidth requirement that an interconnect should fulfil and this information can be used as a weighting indicator for that initiator such that the arbiter will disproportionately select data packets from initiators with higher bandwidth requirements enabling the interconnect to meet its requirements.

In some embodiments, at least some data packets comprise a low priority traffic class indicator indicating that said initiator of said data packet is currently exceeding said bandwidth requirement, said arbiter being responsive to said low priority traffic class indicator to select other contending data packets of a higher priority traffic class in preference to said at least some data packets.

In some embodiments the initiator itself will monitor its output bandwidth and where it determines that it is exceeding its bandwidth requirement will change the traffic class of data packets output. The arbiter will select high priority traffic class data packets in preference to low priority traffic class data packets. Furthermore, as these data packets are of a different traffic class, other data packets that are not in the same traffic class can overtake them. In this way, data packets can be given a low priority but will not block data packets on the same paths of a different traffic class from proceeding. This may be important where the data packets are issued onto paths which carry data packets from initiators that have a low latency requirement. It is important that these data packets are not blocked and thus, changing traffic class allows the low latency data packets to overtake these low priority traffic class data packets.

In some embodiments, said arbiter further comprises a low priority store for storing identifiers identifying initiators currently having a low priority, said arbiter comprising a device for updating a value indicative of a number of data packets selected from each of said initiators, said arbiter being responsive to said value for said initiator reaching a predetermined value, said predetermined value being dependent on said weighting of said initiator, to add said initiator to said low priority store, said arbiter being configured to preferentially select data packets from initiators not in said low priority store over data packets from sources in said low priority store, wherein in response to all of said initiators being added to said low priority store, said low priority store and said values are cleared.

One way of the selection circuitry selecting data packets from initiators with a higher weighting disproportionately more frequently than they select data packets from initiators with a lower weighting is by tracking a number of data packets that have been selected from each of the initiators and when this number reaches a predetermined value that is set dependent on the weighting of the initiator, the initiator is added to a low priority list such that the arbiter will then preferentially select data packets from initiators not in this low priority list. In this way, initiators are added to a low priority list in dependence upon their weightings and the number of times they have recently been output and at this point they are no longer preferentially selected. Once all of the initiators have been added to the low priority list, the list is cleared and the value indicating the number of data packets selected from each of the initiators is also cleared and the process starts again.

In some embodiments, said device for updating said value indicative of a number of data packets comprises a counter for counting said data packets.

Although the device updating the value indicative of the number of data packets can be a value that provides a rough indication such as 1, 2, 4 or 8 or greater, it may be a counter that counts the exact number.

A second aspect of the present aspect provides an initiator for generating and outputting data packets to an interconnect for routing to a recipient, said initiator being configured to generate a weighting value indicative of a bandwidth requirement of said initiator to be output with each data packet and to output said data packets in a predetermined traffic class;

said initiator comprising monitoring circuitry for monitoring a rate of output of said data packets and for determining when said rate of output exceeds said bandwidth requirement, said initiator being responsive to determining said rate of output exceeding said bandwidth requirement to add an indicator to said data packet to indicate said data packet is being output in a lower priority traffic class different to said predetermined traffic class.

As noted previously an initiator generates data packets and it may add a weighting value indicative of a bandwidth requirement of the initiator. It may also monitor the rate of output of the data packets and determine when the rate exceeds the bandwidth requirement. When it detects this it demotes data packets output subsequently to a different lower priority traffic class and adds an indicator to the data packet indicating this. In such a case the interconnect that transmits the data packet will allow other data packets from other traffic classes to overtake it where appropriate. Furthermore, the arbiter that determines which data packet to select where there is contention will select data packets from traffic classes of a higher priority in preference over this data packet.

A third aspect of the present invention provides an arbiter configured to select one of a plurality of contending data packets transmitted from one of a plurality of initiators, said data packets comprising an identifier identifying said initiator and data, said arbiter comprising:

a history buffer for storing said identifiers identifying said initiators of a plurality of recently selected data packets; and selection circuitry configured to select one of said contending data packets in dependence upon said initiators of said contending data packets and said initiators identified in said history buffer, such that a probability of a data packet being selected increases with the number of data packets selected since a data packet from the same initiator was selected.

A fourth aspect of the present invention provides a method of selecting one of a plurality of contending data packets transmitted from one of a plurality of initiators, said data packets comprising an identifier identifying said initiator and an identifier identifying a recipient and data, said method comprising the steps of:

comparing an initiator of each of said contending data packets with initiators identified in a history buffer storing initiator identifiers of a plurality of recently output data packets; and selecting one of said contending data packets in dependence upon said initiators of said contending data packets and said initiators identified in said history buffer, such that a probability of a data packet being selected increases with the number of data packets selected since a data packet from the same initiator was selected.

A fifth aspect of the present invention provides an arbiter means for selecting one of a plurality of contending data packets transmitted from one of a plurality of initiators, said data packets comprising an identifier identifying said initiator and an identifier identifying a recipient and data, said arbiter means comprising:

a history buffer means for storing said identifiers identifying said initiators of a plurality of recently selected data packets; and said arbiter means comprising selection means for selecting one of said contending data packets in dependence upon said initiators of said contending data packets and said initiators identified in said history buffer, such that a probability of a data packet being selected increases with the number of data packets selected since a data packet from the same initiator was selected.

The above, and other objects, features and advantages of this invention will be apparent from the following detailed description of illustrative embodiments which is to be read in connection with the accompanying drawings.

DESCRIPTION OF THE EXAMPLE
NON-LIMITING EMBODIMENTS

Figure 2:
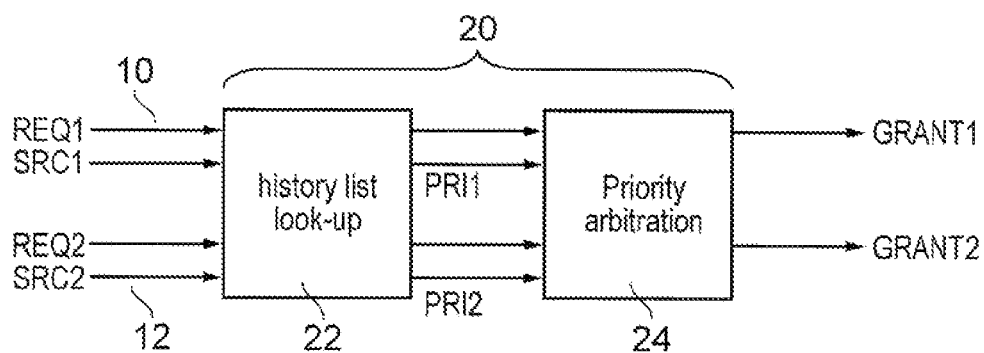
FIG. 2 schematically shows an implementation of an arbitration scheme according to an embodiment of the present invention.

FIG. 2 schematically shows a router 20 and arbiter according to an embodiment of the present invention. Data packets are received at two inputs 10 and 12 of router 20, and each data packet comprises in this example a request REQ1, REQ2 and an identifier identifying the initiator of the data packet SRC1, SRC2. Router 20 comprises arbitration circuitry 22 which has a history list comprising a list of identifiers identifying initiators of recently selected data packets stored in an order that they were output in. Arbitration circuitry 22 within router 20 compares the initiator ID's of the two data packets received with the list of recently output packets and prioritises the data packet from the initiator that has least recently been selected.

This information is then output to the further circuitry 24 which grants the data packets access to the output port in the order of priority provided by circuitry 22.

Figure 6:
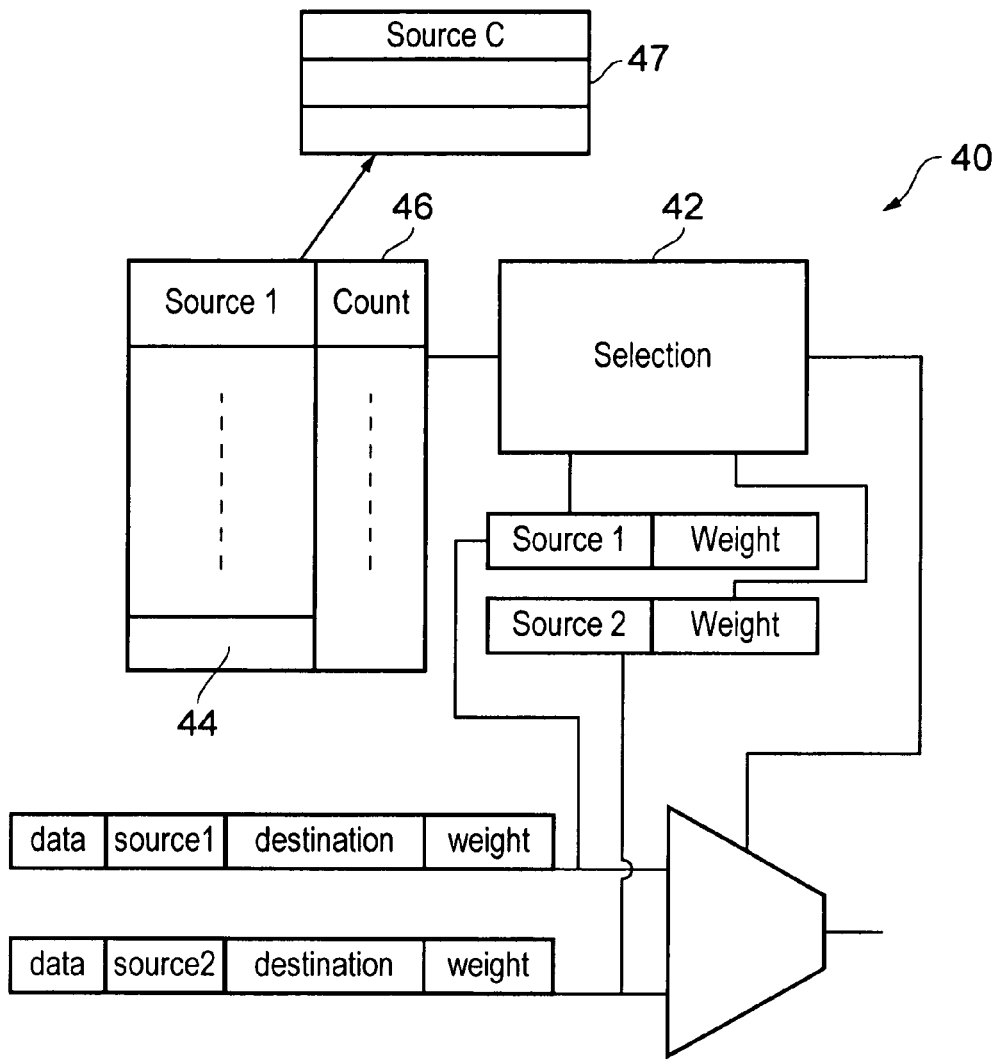
FIG. 6 schematically shows a router and arbitration circuitry that receives traffic from different sources with weighting requirements tied to their bandwidth requirements.

In this way, each router stores some history of the order of the initiator ID's of each packet it transmits. The initiator ID of the packet on each input port that are contending are compared to the initiator ID's in the history lists and the arbiter chooses between the currently contending initiator ID's in a strongly fair manner. Initiator ID's not on the list receive top priority. It should be noted that this arbitration decision may be serialised over a number of cycles or phases, with in some cases different subsets of the requests having different priorities being considered in each phase. For example, the serialisation is useful when weighting indicators such as are described with respect to FIG. 6 are used. In such a case, in a first phase, only requests with the highest weighting may be considered, while in a subsequent phase other requests with the highest and the next highest weighting may be considered and so on. The implementation advantage of this approach is that the requests that are not of relevance to a particular phase are in effect masked and only a smaller number of un-masked requests are considered during the selection. This allows only a subset of the requests to be considered at each phase allowing a smaller arbiter to be used. As the arbiter is often on the critical path it is particularly advantageous if a simpler and smaller arbiter than one that had to consider the relative weightings at each decision can be used.

It is not necessary to keep a complete history of the order in which all the initiators are granted access to the port. By keeping a list of the subset of the most recently granted initiators an approximately fair allocation of bandwidth can generally be achieved, or in the likely case that not all initiators have requests that contend at the router, a substantially fair allocation of bandwidth can be achieved.

Figure 1:
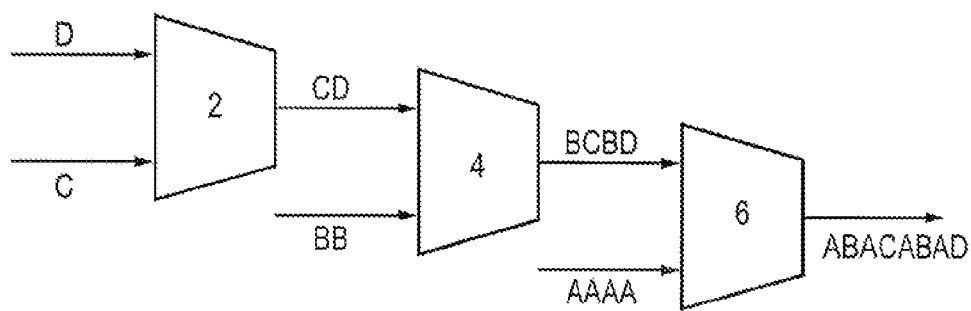
FIG. 1 schematically shows routers arranged in series.
Figure 3:
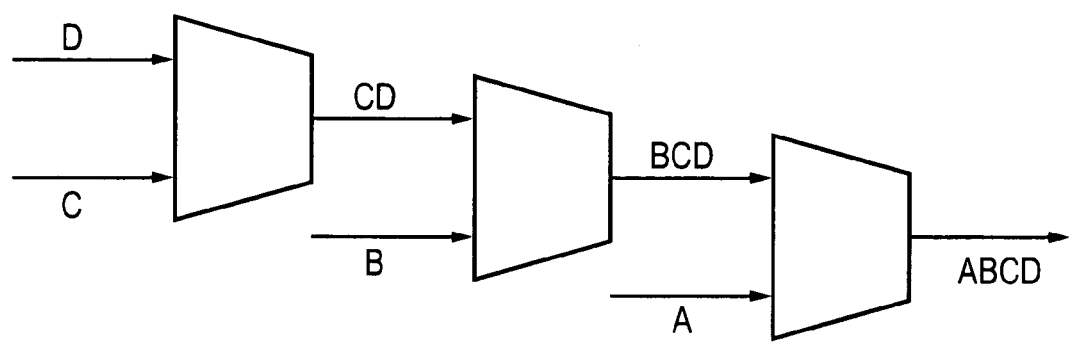
FIG. 3 schematically shows how arbitrating according to source generates a fair arbitration scheme.

FIG. 3 shows an example of the operation of the scheme of the present technique in the example router shown in FIG. 1. Again there are four sources of traffic all requesting bandwidth at an equal rate. However, in this case at each stage all request sources receive an equal share of bandwidth and thus the traffic at the output contains an equal number of data packets from each source.

Figure 4:
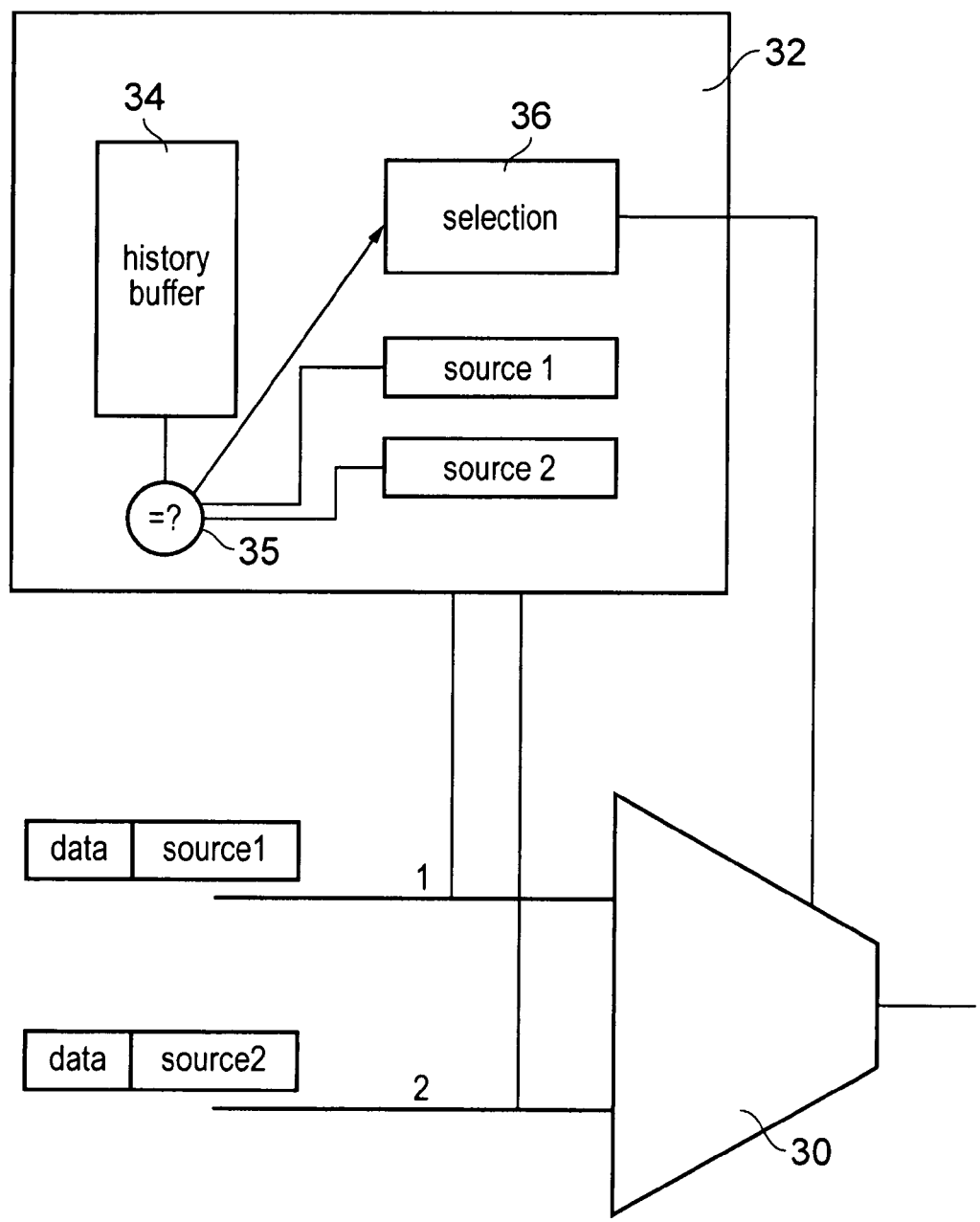
FIG. 4 schematically shows a router and arbitrator according to an embodiment of the present invention.

FIG. 4 shows in more detail an example router and arbiter according to an embodiment of the present invention. Again two data streams 1 and 2 are received at a 2:1 router 30, the router 30 being associated with arbiter 32. Arbiter 32 looks at the source or initiator identifiers associated with the data packets on each data stream and compares these with the list of source ID's stored in history buffer 34 that stores a list of the sources of recently output data packets. Comparator 35 compares the source ID's of the two input data streams with those in the history buffer 34 and selection circuitry 36 selects a data stream having a source ID that does not appear in history buffer 34 or appears less recently than the source ID of the other data stream. If neither appears then it will select one of them arbitrarily. The selection signal is then sent to router 30 which outputs the selected data packet and an identifier identifying the source of the selected data packet is added to the history buffer 34. The other non-selected data packet is in this embodiment stalled and at a next stage may be output or may be one of two data packets contending for output. In this regard, at the next cycle if another data packet has been received on the selected data stream then the selection process will occur again with respect to the stalled data packet and the newly arrived data packet.

Although in this embodiment the data packets are being stalled if they are not selected. In other embodiments for example in the case of a free flowing ring network which has no buffers then the non-selected data packet may simply be deflected and transmitted further around the ring appearing at the router a certain number of cycles later when it will again contend to be output.

In the previous examples each of the sources have had equal bandwidth requirements. However, it is advantageous if an interconnect can deal with sources with different bandwidth requirements. In this regard, there may be an initiator such as a CPU whose performance requirements are high and thus, it is important that its requests are dealt with quickly and are transmitted through the interconnect with a low latency. Thus, it is advantageous if data packets from some sources can in effect be prioritised.

Figure 5:
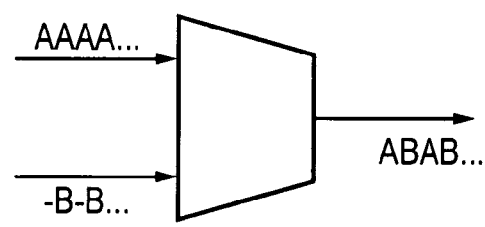
FIG. 5 schematically shows a router receiving data from sources that have different bandwidth.

Another problem with a strictly fair arbitration system occurs where one initiator outputs data packets more frequently but on the same data path as another initiator. FIG. 5 shows what occurs if an initiator outputs data packets faster than another initiator but a router selects the data packets in a strongly fair arbitration policy such that the resource is divided equally between sources A and B.

It would be advantageous if one could prioritise sources with a higher bandwidth requirement over those with a lower bandwidth requirement.

FIG. 6 shows a router and arbiter according to an embodiment of the invention in which in addition to the data packets providing information about its source it also comprises a weighting indicator which is indicative of the bandwidth requirement of the initiator or source that sent it. In such a case arbitration circuitry 40 will take both the source information and the weighting of that source from the data packet and selection circuitry 42 will compare this information with information stored in the history buffer 44. It should be noted that the weighting indicator may only provide a coarse approximation to the exact bandwidth requirement of the source, with low priority requests having a floor value.

In this embodiment the history buffer 44 stores the identifiers identifying the source of recently received data packets along with a count value 46 which provides an indication of a number of times that these data packets have been received since the counter was cleared. When the count value reaches a predetermined value that is dependent upon the weighting of the source, this indicates that the source has had the amount of bandwidth requirement that its weighting indicates it needs and it is demoted to a low priority list 47. Selection circuitry 42 will not preferentially select a source that is in the low priority list 47 where there is a contending source that is not in this list. In this way the weighting requirements of the source are accounted for and those with higher bandwidth requirements are preferentially selected over those with lower bandwidth requirements, in that a source with a lower bandwidth requirement will be moved to the low priority list once they have been selected a lower number of times than those with a higher bandwidth requirement.

Figure 7:
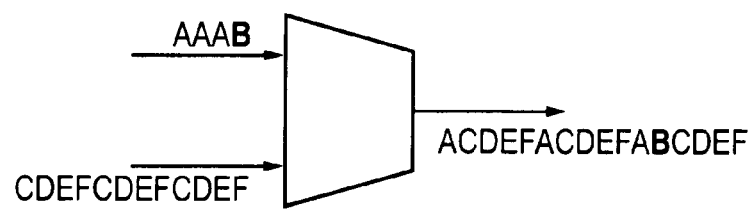
FIG. 7 schematically shows problems that may arrive where a strongly fair arbitration scheme is used with sources that have different bandwidths.

FIG. 7 shows a further problem that may arise where a strongly fair arbitration scheme is used with sources that have different bandwidths. Suppose that source A and source B output data packets to the same data path and that source A has three times the bandwidth of source B and thus, will output three data packets before a data packet is output by the less frequent source B. If the subsequent router is a strongly fair router and the other data stream contains packets from other sources C, D, E and F then once a packet from source A has been selected it will appear in the history list and the packets from C, D, E and F will have priority over it and these will be selected before the next packet from source A is selected. As the packet from source B appears after the third packet from source A this will delay selection of the data packet from source B which will then only get one sixteenth of the available bandwidth. In a truly latency fair arbiter with a policy of prioritising low rate requests it should have been allocated one sixth of the available bandwidth. One way of addressing this problem is by using an initiator such as is shown in FIG. 8.

Figure 8:
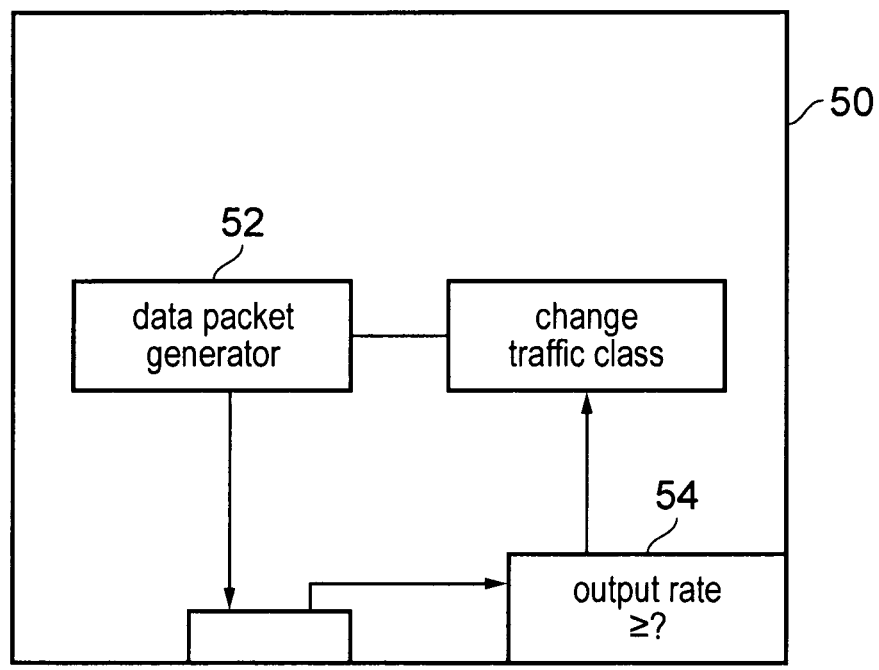
FIG. 8 schematically shows an initiator configured to change a traffic class of data packets according to the output rate of the data packet and the bandwidth requirements for the device.

FIG. 8 shows an initiator 50 that has a data packet generator 52 which generates and outputs data packets. These data packets will include an identifier of the initiator 50 and a weighting indicator indicating the bandwidth requirement of the initiator device 50. In this particular case there is a monitor 54 that monitors the output rate of the initiator 50 and when it detects that it is greater than the required to bandwidth rate it will change the traffic class of the data packet that it outputs. One way of allowing data packets to overtake other data packets on the same data stream is by sending them as a different traffic class. It should be noted that although this circuitry that changes the traffic class of the data packets in response to a detected output rate of an initiator is shown within the initiator it can in some embodiments be located in the network or the network interface. In such a case the initiator identifier associated with a packet will allow the monitor 54 to monitor the output rate of the initiator and change the traffic class of the packet when a predetermined level is detected.

In this regard, in some interconnects it may be useful to divide network traffic into a number of different traffic classes in order to more efficiently manage the allocation of resources between packets. Different classes of packets may have different requirements, some may be latency sensitive, others may be less sensitive to latency but may be jitter insensitive and some may tolerate packet loss while others may not. Resources may be allocated based on classes and this allows certain classes to get a higher level of service than others. The use of different traffic classes allows packets to overtake packets in the same stream that are from another class. This may be done with the use of a buffer within a router which stores the packets awaiting output and uses time multiplexing to output different packets from the buffer across a data path. Packets from different classes are stored in different locations in the buffer and are not necessarily output in the order that they arrive at the router thereby allowing overtaking by other data packets in the buffer.

Thus, by demoting the class of traffic of the data packet to a lower traffic class when the bandwidth requirements have been met the initiator 50 or circuitry within the network can ensure that data packets from a particular initiator are not given too high a priority and other data packets on this data stream are able to overtake data packets from the initiator that have had their traffic class reduced. In this way, if a situation arrives such as shown in FIG. 7 then after a certain number of data packets from source A have been output, subsequent packets will be of a lower traffic class and data packet B will be seen by the router as a different traffic class and will be selected in a fair manner with respect to data packets from sources C, D, E and F.

Figure 9:
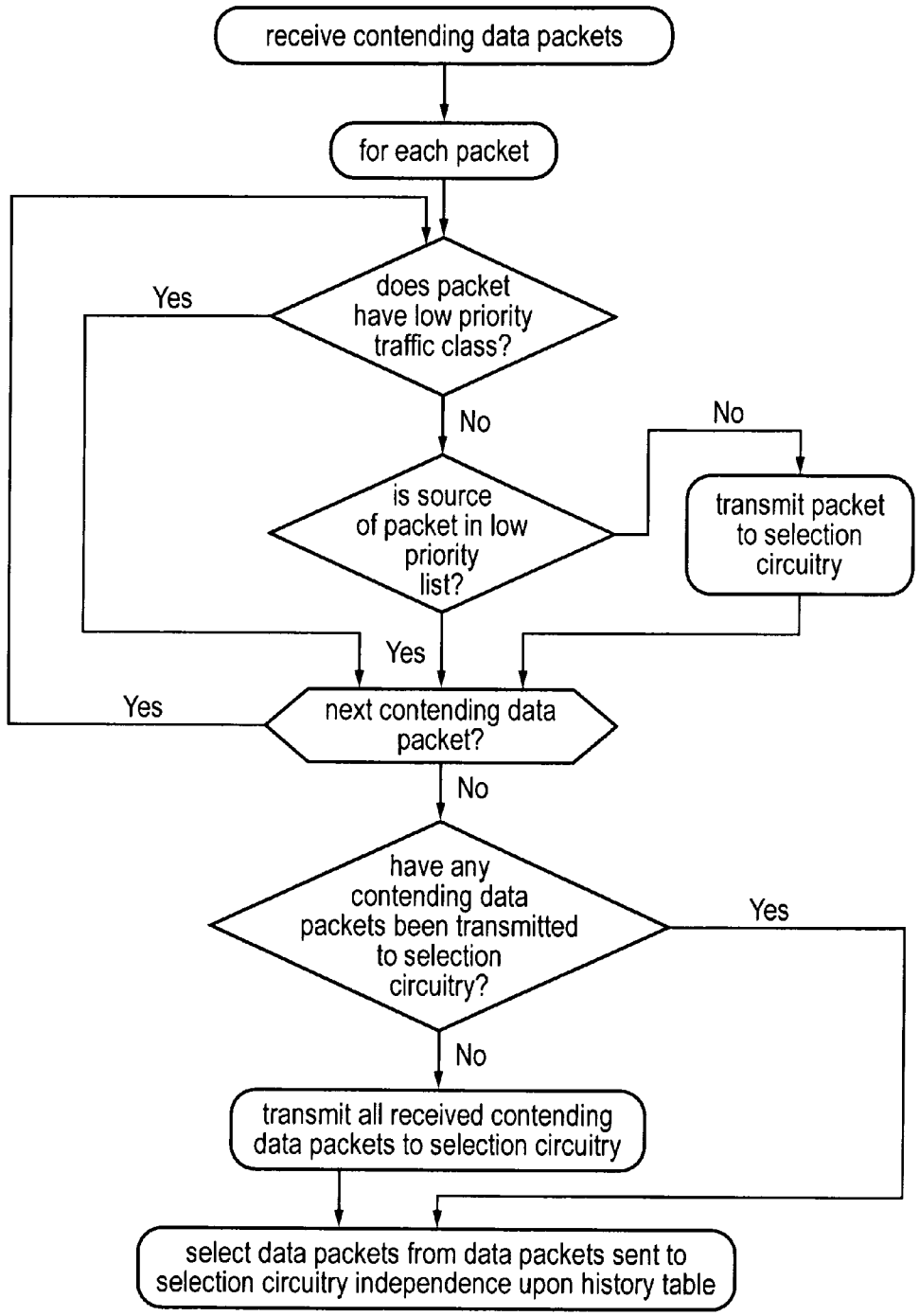
FIG. 9 shows a flow diagram illustrating steps in a method according to an embodiment of the present invention.

FIG. 9 shows a flow diagram illustrating steps in a method for selecting data packets that have weighting values according to an embodiment of the present invention. Initially contending data packets are received and for each data packet it is determined if the data packet is a low priority traffic class or if it is in a low priority list. If the answer to both of these is no then the data packet is transmitted to the selection circuitry of the arbiter. If the answer to either of them is yes then it is not at this point transmitted to the selection circuitry. In other implementations there may not be a simple yes or no selection, rather the selection will be more sophisticated and the lower weighted or lower traffic class data packets will be transmitted to the selection circuitry less often than the higher weighted or higher traffic class packets. This may be done in a way so that the probability of transmitting packets to the selection circuitry with a lower weighting or traffic class is lower than the probability of transmitting those with the higher weighting or higher traffic class.

The next contending data packet is then monitored and again it is determined if it is a low priority traffic class or if it is in the low priority list within the arbiter. Again if it isn't it is transmitted to the selection circuit and if it is, it is not transmitted at this point. Once all the contending data packets have been examined it is determined whether any have been transmitted to the selection circuitry. If any have, then the selection circuitry will select data packets from those packets that have been sent to it in dependence upon information in the history buffer and on the source that these data packets are sent from. If no contending data packets have been transmitted to the selection circuitry then all the received data packets which are either in the low priority list or have a low traffic class are sent to the selection circuitry and the selection circuitry selects from these data packets using information in the history buffer. It should be noted that in some embodiments those with a low traffic class and those from a low priority list may not be treated in the same way. It may be that it is those in the low priority list that are selected from and those in the low traffic class that are not selected where there are data packets from both. This will depend on the particular implementation.

Figure 10:
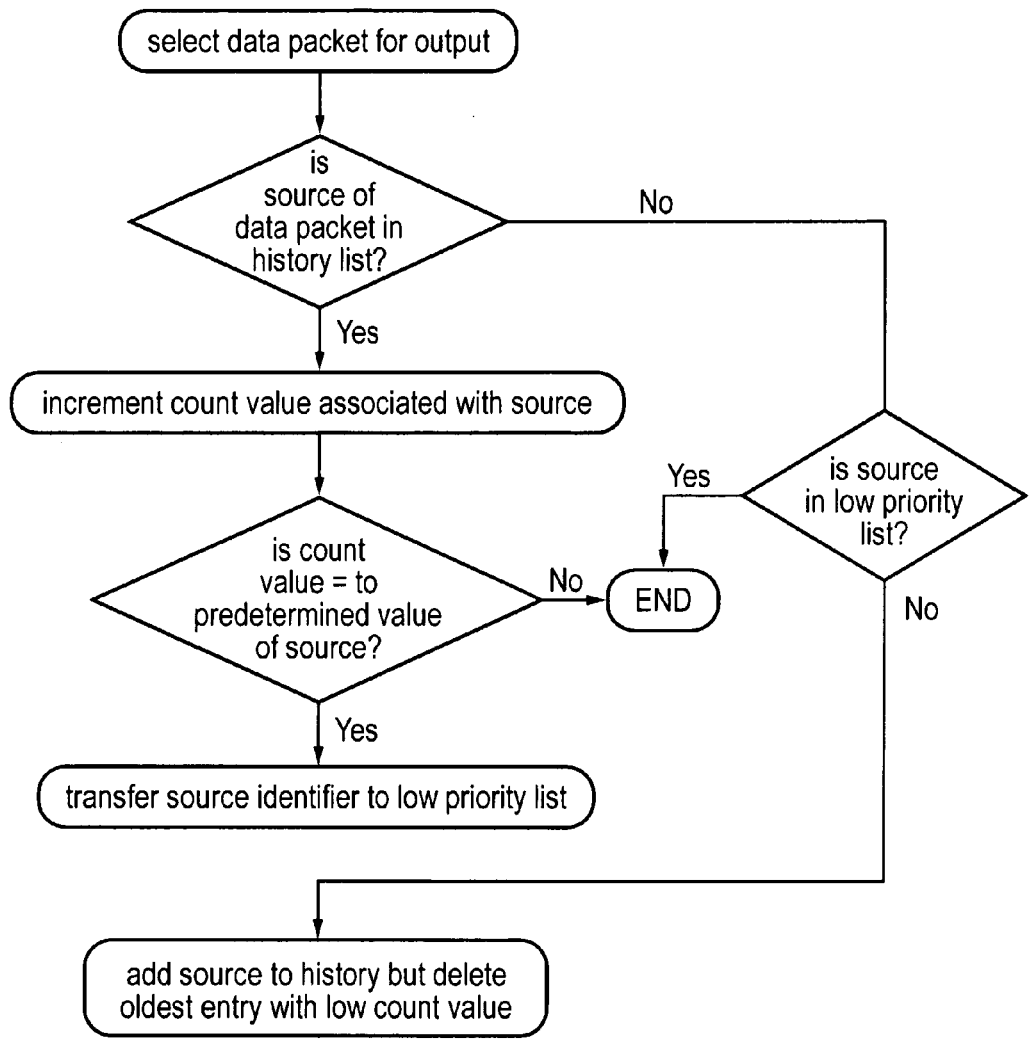
FIG. 10 shows a flow diagram illustrating steps in a method for updating a history buffer.

FIG. 10 shows a flow diagram illustrating steps in a method for updating a history buffer for data packets that have weighting values. In this method once a data packet has been selected for output the history buffer needs to be updated. First it is determined whether the source of the data packets has an entry in the history buffer, if it does then a count value associated with that entry is incremented and it is then determined if the incremented value is equal to a predetermined value that is dependent on the weighting of the source. If it is this means that enough data packets to from this source have been output compared to data packets from other sources and thus, the source identifier is moved from the history buffer to the low priority list, which will mean that data packets from this source will not be selected if they are contending with data packets from sources not in the low priority list of the same traffic class or in some cases will have a lower probability of being selected.

If the count value is not equal to the predetermined value then the entry remains in the history buffer.

If the source identifier of the selected data packet was not in the history buffer then provided that it is not in the low priority list it is added to the history buffer. If the history buffer is full then another entry will be deleted. This may be the oldest entry provided that it has a low count value. Where an old entry has a high count value one does not wish to reset the count value and thus, the entry is not removed from the history buffer.

When all the initiators are in the low priority list this is deleted and the process starts afresh with all count values set to zero.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. An interconnect configured to route data packets between a plurality of initiators and at least one recipient along a plurality of paths, said data packets comprising an identifier identifying said initiator and data, said interconnect comprising:

a plurality of routers, said routers comprising at least two inputs for receiving said data packets from at least two different paths and an output for outputting said received data packets;

at least one of said routers comprising an arbiter configured to select between contending data packets input to said at least one router from said different paths to be output at said output;

said arbiter comprising a history buffer for storing said identifiers identifying said initiators of a plurality of recently output data packets;

said arbiter comprising selection circuitry configured to select one of said contending data packets to be output in dependence upon said initiators of said contending data packets and said initiators identified in said history buffer, such that a probability of a data packet being selected increases with the number of data packets selected since a data packet from the same initiator was selected;

wherein said arbiter is configured to access weighting indicators indicative of a weighting of at least some of said plurality of initiators, said selection circuitry being configured to select data packets from initiators with a higher weighting disproportionately more frequently than said selection circuitry selects data packets from initiators with a lower weighting;

wherein said arbiter further comprises a low priority store for storing identifiers identifying initiators currently having a low priority, said arbiter comprising a device for updating a value indicative of a number of data packets selected from each of said initiators, said arbiter being configured to add said initiator to said low priority store in response to said value for said initiator reaching a predetermined value, said arbiter being configured to preferentially select data packets from initiators not in said low priority store over data packets from sources in said low priority store;

wherein in response to all of said initiators being added to said low priority store, said low priority store and said values are cleared; and wherein said predetermined value is dependent on said weighting of said initiator.

2. An interconnect according to claim 1, wherein said selection circuitry is configured to select said contending data packet sent from said initiator that is determined from said history buffer to have been least recently selected for output.

3. An interconnect according to claim 1, wherein following selection of said data packet said arbiter is configured to update said history buffer with said identifier identifying said initiator of said output data packet and to delete an oldest entry in said history buffer, said history buffer storing a list of said most recently output data packets.

4. An interconnect according to claim 1, wherein said history buffer comprises fewer entries than a number of said plurality of initiators.

5. An interconnect according to claim 1, wherein at least some of said data packets further comprise said weighting indicator indicating said weighting of said initiator.

6. An interconnect according to claim 1, wherein said weighting indicator indicates a requested bandwidth requirement of said initiator, a higher bandwidth requirement indicating a higher weighting.

7. An interconnect according to claim 6, at least some data packets comprising a low priority traffic class indicator indicating that said initiator of said data packet is currently exceeding said bandwidth requirement, said arbiter being responsive to said low priority traffic class indicator to select other contending data packets of a higher priority traffic class in preference to said data packet.

8. An interconnect according to claim 1, wherein said device for updating said value indicative of a number of data packets comprises a counter for counting said data packets.

9. An initiator for generating and outputting data packets to an interconnect for routing to a recipient, said initiator being configured to generate a weighting value indicative of a bandwidth requirement of said initiator to be output with each data packet and to output said data packets in a predetermined traffic class;

said initiator comprising monitoring circuitry for monitoring a rate of output of said data packets and for determining when said rate of output exceeds said bandwidth requirement, said initiator being responsive to determining said rate of output exceeding said bandwidth requirement to add an indicator to said data packet to indicate said data packet is being output in a lower priority traffic class different to said predetermined traffic class.

10. An arbiter configured to select one of a plurality of contending data packets transmitted from one of a plurality of initiators, said data packets comprising an identifier identifying said initiator and data, said arbiter comprising:

a history buffer for storing said identifiers identifying said initiators of a plurality of recently selected data packets; and selection circuitry configured to select one of said contending data packets in dependence upon said initiators of said contending data packets and said initiators identified in said history buffer, such that a probability of a data packet being selected increases with the number of data packets selected since a data packet from the same initiator was selected wherein said arbiter is configured to access weighting indicators indicative of a weighting of at least some of said plurality of initiators, said selection circuitry being configured to select data packets from initiators with a higher weighting disproportionately more frequently than said selection circuitry selects data packets from initiators with a lower weighting;

wherein said arbiter further comprises a low priority store for storing identifiers identifying initiators currently having a low priority, said arbiter comprising a counter to count a number of data packets selected from each of said initiators, said arbiter being configured to add said initiation to said low priority store in response to a count value for said initiator reaching a predetermined value, said arbiter being configured to select data packets from initiators not in said low priority store in preference to data packets from sources in said low priority store;

wherein in response to all of said initiators being added to said low priority store, said low priority store and said values are cleared; and said predetermined value is dependent on said weighting of said initiator.

11. An arbiter according to claim 10, wherein said selection circuitry is configured to select said contending data packet sent from said initiator that is determined from said history buffer to have been least recently selected.

12. An arbiter according to claim 10, wherein following selection of said data packet said arbiter is configured to update said history buffer with said identifier identifying said initiator of said selected data packet and to delete an oldest entry in said history buffer, said history buffer storing a list of said most recently selected data packets.

13. An arbiter according to claim 10, wherein at least some of said data packets further comprise said weighting indicator indicating said weighting of said initiator.

14. An arbiter according to claim 10, wherein said weighting indicator comprises a requested bandwidth requirement of said initiator, a higher bandwidth requirement indicating a higher weighting.

15. An arbiter according to claim 10, wherein at least some data packets comprising a low priority traffic class indicator indicating that said initiator of said data packet is currently exceeding said bandwidth requirement, said arbiter being responsive to said low priority traffic class indicator to select other contending data packets of a higher priority traffic class in preference to said data packet.

16. A method of selecting one of a plurality of contending data packets transmitted from one of a plurality of initiators, said data packets comprising an identifier identifying said initiator and an identifier identifying a recipient and data, said method comprising the steps of:

comparing an initiator of each of said contending data packets with initiators identified in a history buffer storing initiator identifiers of a plurality of recently output data packets; and selecting one of said contending data packets in dependence upon said initiators of said contending data packets and said initiators identified in said history buffer, such that a probability of a data packet being selected increases with the number of data packets selected since a data packet from the same initiator was selected;
accessing weighting indicators indicative of a weighting of at least some of said plurality of initiators, said selecting step comprising selecting data packets from initiators with a higher weighting disproportionately more frequently than selecting data packets from initiators with a lower weighting;
storing identifiers in a low priority store identifying initiators currently having a low priority;
updating a value indicative of a number of data packets selected from each of said initiators;
adding said initiator to said low priority store in response to said value for said initiator reaching a predetermined value;
preferentially selecting data packets from initiators not in said low priority store over data packets from sources in said low priority store; and
clearing said low priority store and said values in response to all of said initiators being added to said low priority store; and
wherein said predetermined value is dependent on said weighting of said initiator.

17. An arbiter for selecting one of a plurality of contending data packets transmitted from one of a plurality of initiators, said data packets comprising an identifier identifying said initiator and an identifier identifying a recipient and data, said arbiter comprising:
means for storing said identifiers identifying said initiators of a plurality of recently selected data packets; and
means for selecting one of said contending data packets in dependence upon said initiators of said contending data packets and said initiators identified in said means for storing, such that a probability of a data packet being selected increases with the number of data packets selected since a data packet from the same initiator was selected;
wherein said arbiter comprises means for accessing weighting indicators indicative of a weighting of at least some of said plurality of initiators, said means for selecting being operable to select data packets from initiators with a higher weighting disproportionately more frequently than said means for selecting selects data packets from initiators with a lower weighting;
wherein said arbiter further comprises a means for storing identifiers identifying initiators currently having a low priority, said arbiter comprising a device for updating a value indicative of a number of data packets selected from each of said initiators, said arbiter being operable to add said initiator to means for storing in response to said value for said initiator reaching a predetermined value, said arbiter being configured to preferentially select data packets from initiators not in said means for storing over data packets from sources in said means for storing;
wherein in response to all of said initiators being added to said means for storing, said means for storing and said values are cleared; and
wherein said predetermined value is dependent on said weighting of said initiator.

* * * * *